(12) United States Patent
Dorhout

(10) Patent No.: US 10,743,467 B2
(45) Date of Patent: Aug. 18, 2020

(54) SELF-PROPELLED FORAGE HARVESTER CORN HEAD ADAPTER

(71) Applicant: Ivan Dorhout, Rock Valley, IA (US)

(72) Inventor: Ivan Dorhout, Rock Valley, IA (US)

(73) Assignee: KOOIMA AG, INC., Rock Valley, IA (US)

(*) Notice: Subject to any disclaimer, the term of this patent is extended or adjusted under 35 U.S.C. 154(b) by 185 days.

(21) Appl. No.: 15/794,799

(22) Filed: Oct. 26, 2017

(65) Prior Publication Data

US 2019/0124839 A1    May 2, 2019

(51) Int. Cl.
*A01D 41/16* (2006.01)
*A01D 45/02* (2006.01)

(52) U.S. Cl.
CPC ............. *A01D 41/16* (2013.01); *A01D 45/02* (2013.01)

(58) Field of Classification Search
CPC .... A01D 45/025; A01D 34/86; A01D 34/866; A01D 41/16; A01D 41/145; A01D 57/00–30; A01D 61/00–04; A01D 43/00–16; A01D 82/00–02; A01F 29/00; A01F 29/10; A01F 29/01
USPC .................................. 198/780; 241/101.762
See application file for complete search history.

(56) References Cited

U.S. PATENT DOCUMENTS

| | | | |
|---|---|---|---|
| 4,190,209 A | 2/1980 | deBuhr et al. | |
| 4,192,468 A * | 3/1980 | Lawrence | A01F 29/10 241/101.762 |
| 4,193,248 A | 3/1980 | Gilleman | |
| 4,261,161 A | 4/1981 | Colgrove et al. | |
| 5,269,124 A * | 12/1993 | Barthel | A01D 82/00 56/16.4 B |
| 6,073,431 A * | 6/2000 | Osborne | A01D 41/16 56/15.7 |
| 6,363,700 B1 | 4/2002 | Fowler | |
| 6,779,326 B2 * | 8/2004 | Muller | A01F 29/10 56/16.4 B |
| 8,056,311 B1 * | 11/2011 | Barnett | A01D 82/00 56/16.4 B |
| 8,376,126 B1 * | 2/2013 | Waerdt | A01D 41/16 198/780 |
| 2003/0188521 A1 * | 10/2003 | Muller | A01F 29/10 56/16.4 R |

(Continued)

FOREIGN PATENT DOCUMENTS

| | | |
|---|---|---|
| CN | 102047837 | 12/2011 |
| CN | 205755697 | 12/2016 |
| CN | 106258225 | 1/2017 |

*Primary Examiner* — Robert E Pezzuto
*Assistant Examiner* — Adam J Behrens
(74) *Attorney, Agent, or Firm* — Ballard Spahr LLP

(57) ABSTRACT

A self-propelled forage harvester corn head adapter allows a self-propelled forage harvester to utilize a corn head of the type used to harvest corn with a combine. The adapter includes a frame configured for coupling to a self-propelled forage harvester. A central panel is coupled to the frame and has an opening extending through the central panel. A lower roller assembly has a lower roller positioned to extend along a lower edge of the opening. An upper roller assembly extends across the opening having an upper roller being parallel to the lower roller assembly. The upper roller assembly is movably coupled relative to the central panel such that spacing between the upper roller and the lower roller is adjustable.

18 Claims, 4 Drawing Sheets

(56) References Cited

U.S. PATENT DOCUMENTS

2012/0266581 A1\* 10/2012 Dreer .................. A01D 43/088
56/16.4 B
2018/0116118 A1\* 5/2018 Bertino .................. A01F 29/10

\* cited by examiner

US 10,743,467 B2

SELF-PROPELLED FORAGE HARVESTER CORN HEAD ADAPTER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to harvester head adapter devices and more particularly pertains to a new harvester head adapter device for allowing a self-propelled forage harvester to utilize a corn head of the type used to harvest corn with a combine.

BRIEF SUMMARY OF THE INVENTION

An embodiment of the disclosure meets the needs presented above by generally comprising a frame configured for coupling to a self-propelled forage harvester. A central panel is coupled to the frame and has an opening extending through the central panel. A lower roller assembly has a lower roller positioned to extend along a lower edge of the opening. An upper roller assembly extends across the opening having an upper roller being parallel to the lower roller assembly. The upper roller assembly is movably coupled relative to the central panel such that spacing between the upper roller and the lower roller is adjustable and determined by the material passing through.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
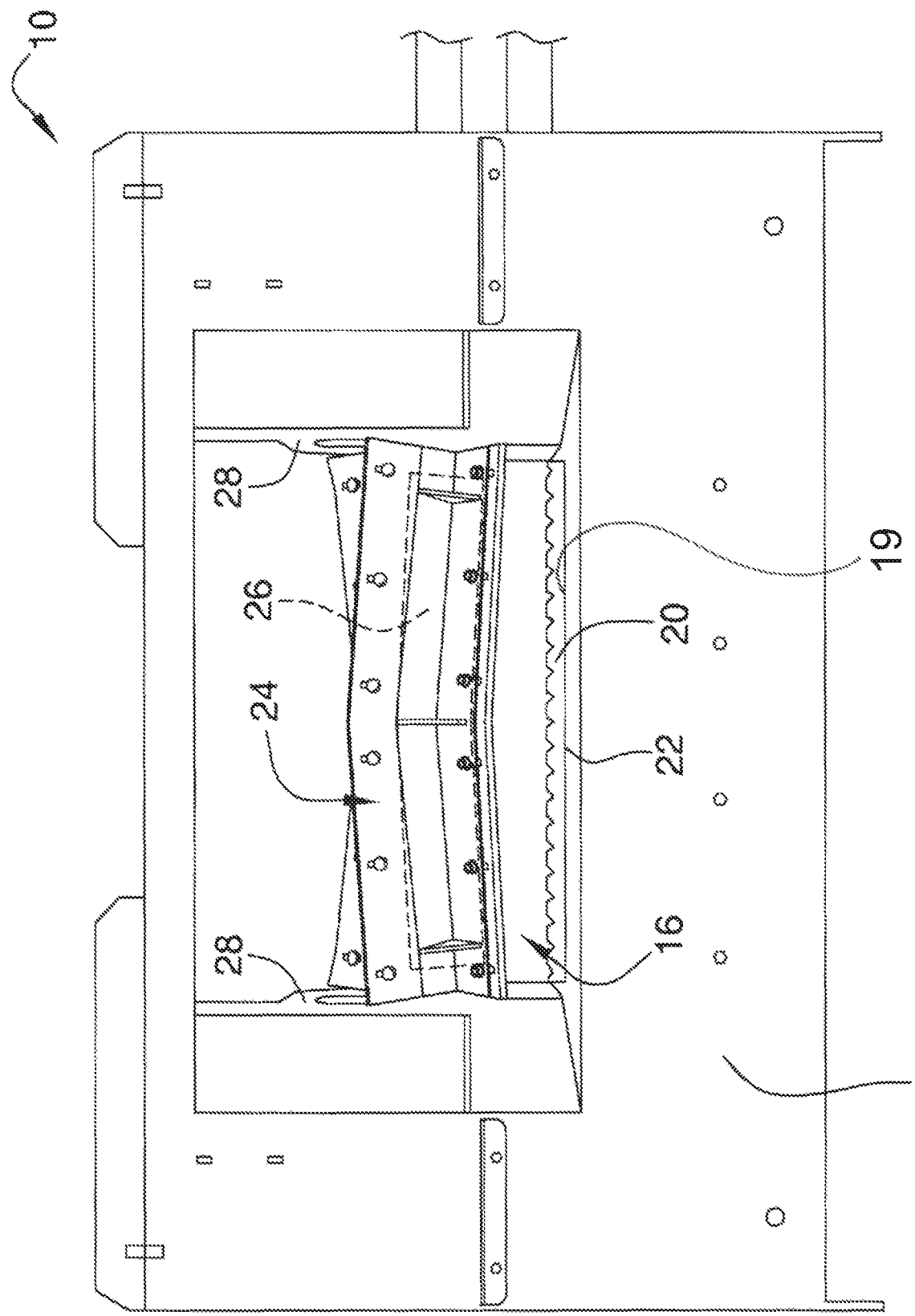
FIG. 1 is a front view of a self-propelled forage harvester corn head adapter according to an embodiment of the disclosure.
Figure 2:
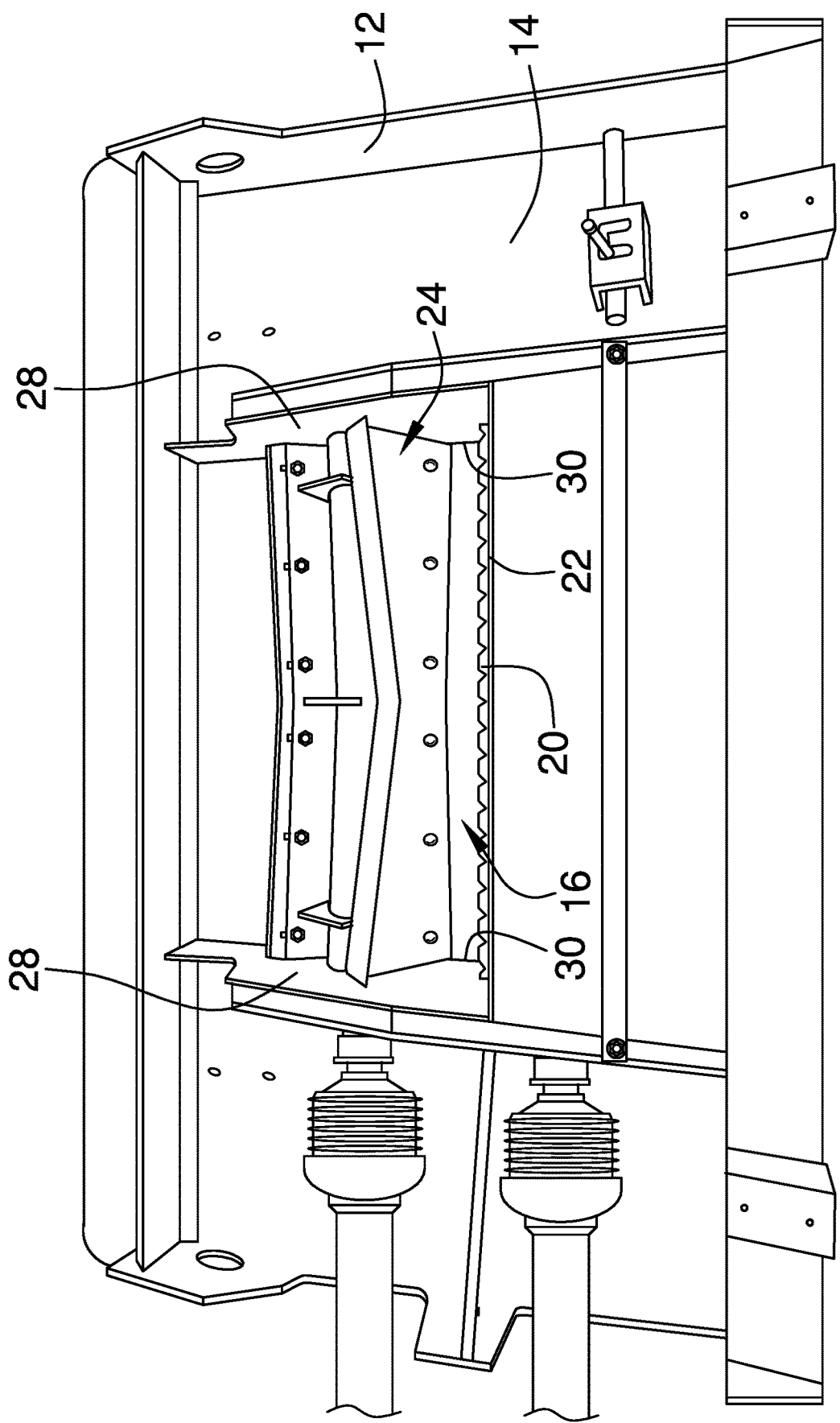
FIG. 2 is a rear view of an embodiment of the disclosure.
Figure 3:
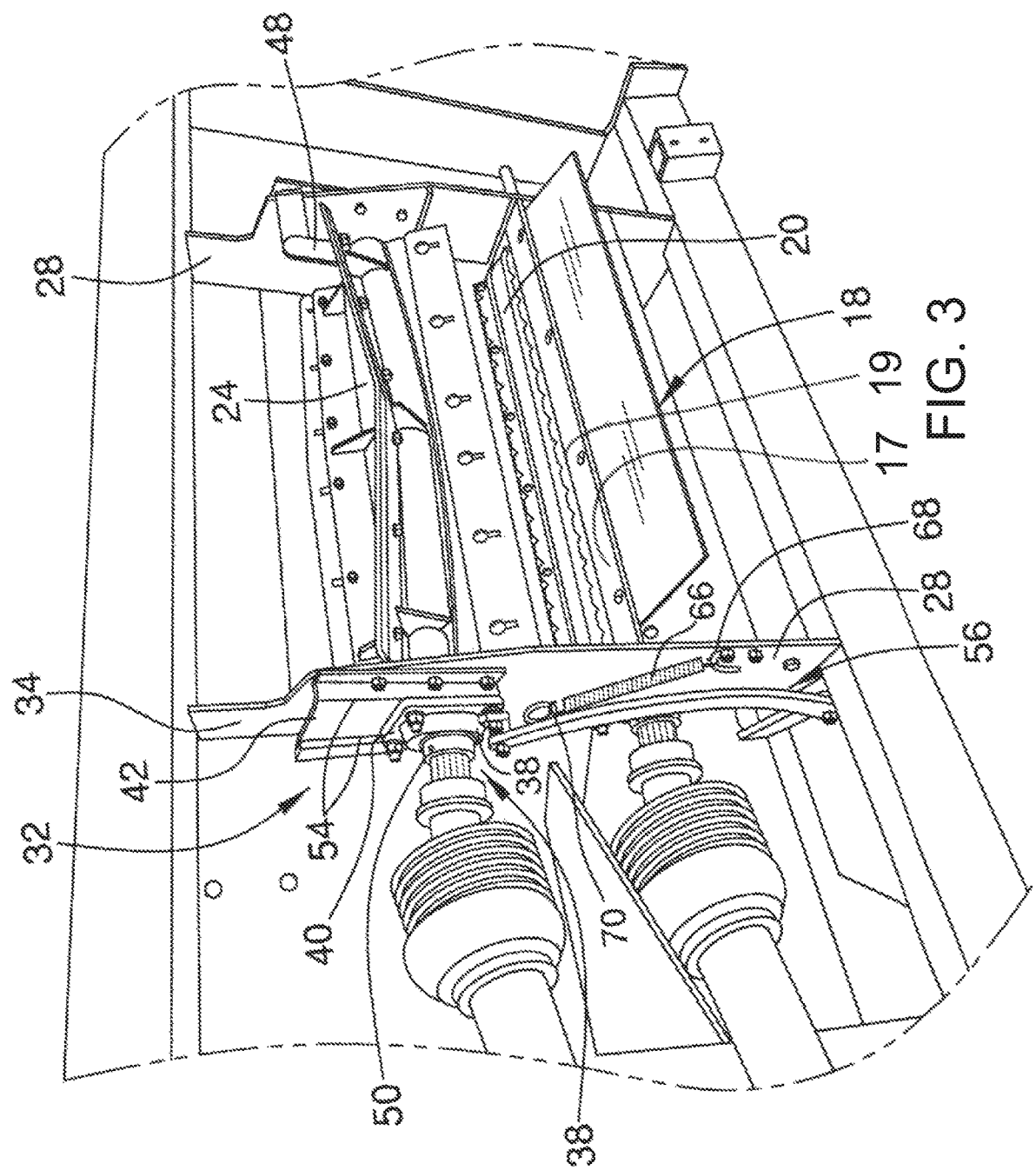
FIG. 3 is a top rear side perspective view of an embodiment of the disclosure.
Figure 4:
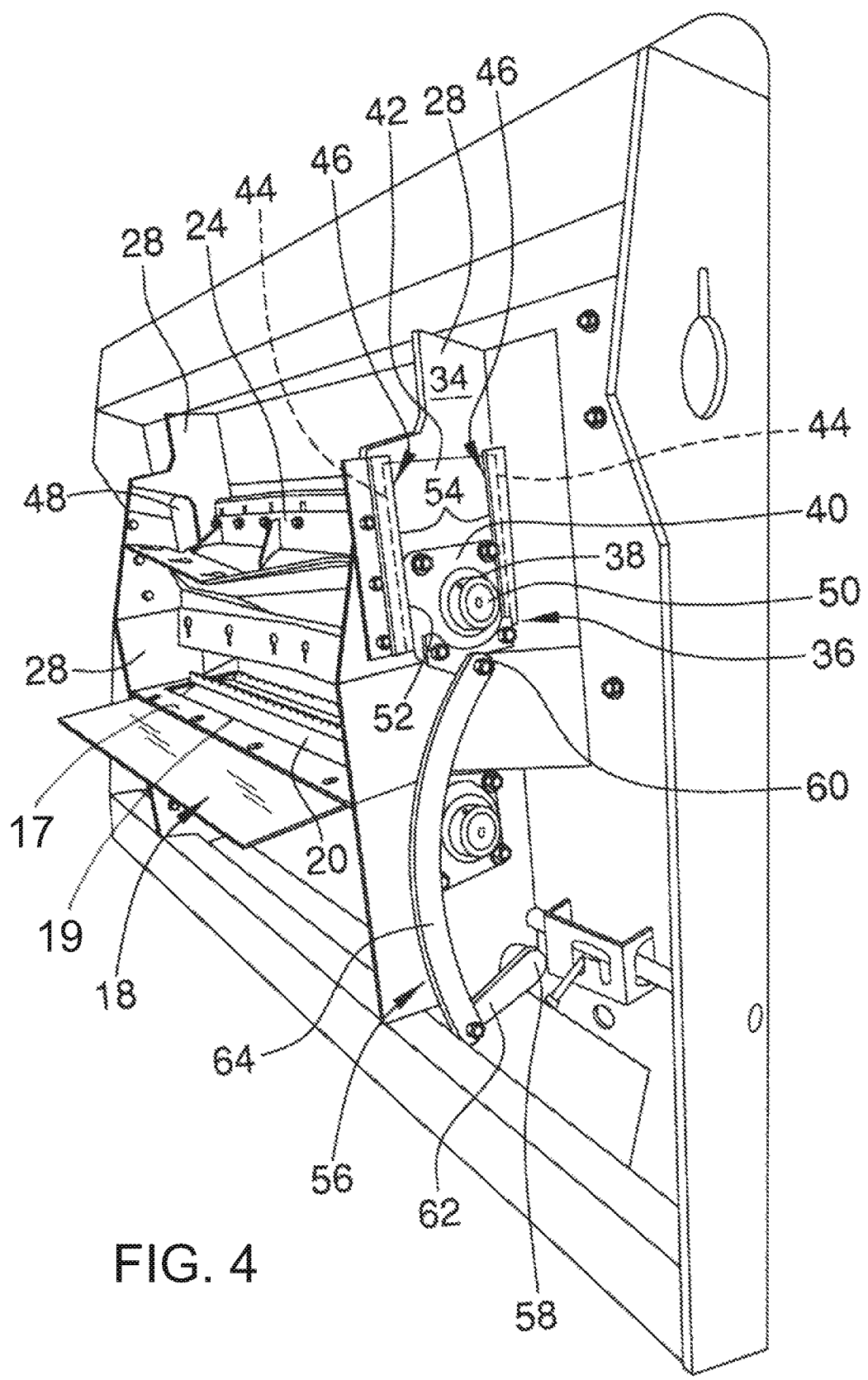
FIG. 4 is a rear side perspective view of an embodiment of the disclosure.

With reference now to the drawings, and in particular to FIGS. 1 through 4 thereof, a new harvester head adapter device embodying the principles and concepts of an embodiment of the disclosure and generally designated by the reference numeral 10 will be described.

As best illustrated in FIGS. 1 through 4, the self-propelled forage harvester corn head adapter 10 generally comprises a frame 12 configured for coupling to a self-propelled forage harvester in a conventional manner. Various adapters already exist and any conventional structure for attachment may be utilized. A central panel 14 is coupled to the frame 12. The central panel 14 has an opening 16 extending through the central panel 14. A lower boundary of the opening 16 in the central panel may be defined by a lower edge 22 and a floor 17 extending rearwardly from the lower edge (see, for example, FIGS. 3 and 4). The floor 17 may have an upper surface that extends substantially perpendicular to a forward surface of the central panel 14. A slot 19 may extend through the floor 17 and may be oriented substantially parallel to the forward surface of the central panel (see, for example, FIG. 1). In a conventional adapter, ears of corn are passed through the opening 16 facilitated by one or more rollers. In the present adapter 10, a lower roller assembly 18 is coupled to the central panel 14. The lower roller assembly 18 has a lower roller 20 being positioned below the floor 17 of the lower boundary with a portion of the lower roller protruding upwardly through the slot 19 in the floor (see, for example, FIGS. 3 and 4) such that the lower roller extends along a lower edge 22 of the opening 16. The lower roller 20 is in a fixed position relative to the opening 16. An upper roller assembly 24 is coupled to the central panel 14. The upper roller assembly 24 extends across the opening 16. The upper roller assembly 24 has an upper roller 26 parallel to the lower roller assembly 18. The upper roller assembly 24 is movably coupled relative to the central panel 14 wherein spacing between the upper roller 26 and the lower roller 20 is adjustable.

Each of a pair of mounts 28 is coupled to the central panel 14. The mounts 28 are positioned on respective lateral sides 30 of the opening 16. Each of the mounts 28 may be planar and braced in a conventional manner. The lower roller assembly 18 is coupled to and extends between the mounts 28. Each of a pair of guides 32 is coupled to an associated one of the mounts 28. Each of the guides 32 is positioned on an outwardly facing surface 34 of the associated one of the mounts 28 relative to the opening 16. The upper roller assembly 24 has a pair of end hubs 36. Each of the pair of end hubs 36 is coupled to an associated one of the guides 32. Each of the end hubs 36 includes a bearing 38, a bearing plate 40 to which the bearing 38 is coupled, and a mounting plate 42. The bearing plate 40 is coupled to the mounting plate 42. The mounting plate 42 has opposite lateral edges 44 positioned within opposed grooves 46 of the associated guide 32 wherein the mounting plate 42 is slidable relative to the guide 32. Each of a pair of slots 48 extends through an associated one of the mounts 28. The upper roller assembly 24 has a pair of outer axles 50. Each of the outer axles 50 extends through an associated one of the slots 48. Each of the outer axles 50 extends through the mounting plate 42 and is seated in an associated one of the bearings 38 to allow for rotation of the upper roller 26. Each bearing plate 40 may have outer edges 52 positioned adjacent to guide surfaces 54 of the associated guide 32 to further facilitate seating of the end hubs 36 in the guides 32.

Each of a pair of guide arms 56 has a first end 58 coupled to an associated one of the mounts 28. Each of the guide arms 56 has a second end 60 coupled to an associated one of the end hubs 36. Each of the guide arms 56 has a first section 62 pivotally coupled to a second section 64. The first section 62 is straight while the second section 64 is arcuate allowing the guide arm 56 to pivot and move around any portion of the lower roller assembly 28 which may protrude through the mounts 28. A biasing member 66 is coupled to the upper roller assembly 24 such that the biasing member 66 urges the upper roller 26 towards the lower roller 20. The biasing member 66 has a first end 68 coupled to one of the mounts 28. The biasing member 66 has a second end 70 coupled to one of the guide arms 56. More specifically, the second end 70 of the biasing member 66 may be coupled to the second section 64 of the one of the guide arms 56.

In use, the frame is coupled to a self-propelled forage harvester. Ears of corn are passed through the opening by passing between the lower roller and upper roller. The upper roller maintains parallel orientation to the lower roller but is free to slide upwardly to accommodate variances in the thickness of matter passing over the lower roller. The biasing member and guide arms maintain downward pressure on the upper roller greater than the weight of the upper roller assembly. The upper roller and lower roller are each attached to a respective motive source which may be a hydraulic connection or the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A self-propelled forage harvester corn head adapter device comprising:
   a frame coupled between a self-propelled forage harvester and a corn head;
   a central panel coupled to said frame, said central panel having an opening extending through said central panel, said opening configured to receive ears of corn from the corn head, a lower boundary of said opening being defined by a lower edge and a floor extending rearwardly from said lower edge, a slot extending through said floor; and
   a lower roller assembly coupled to said central panel, said lower roller assembly having a lower roller being positioned below said floor of said lower boundary with a portion of said lower roller protruding upwardly through said slot in said floor along said lower edge of said opening.

2. The device of claim 1, wherein said lower roller is in a fixed position relative to said opening.

3. The device of claim 1, wherein said floor has an upper surface extending substantially perpendicular to a forward surface of said central panel, said slot being elongated along an axis extending substantially parallel to said forward surface of said central panel.

4. The device of claim 1, further comprising an upper roller assembly coupled to said central panel, said upper roller assembly extending across said opening in a position above said portion of said lower roller protruding through said slot.

5. The device of claim 4, wherein said upper roller assembly comprises an upper roller, and wherein said upper roller assembly is movably coupled relative to said central panel such that spacing between said upper roller and said lower roller is adjustable.

6. The device of claim 5, further comprising a biasing member coupled to said upper roller assembly such that said biasing member urges said upper roller towards said lower roller.

7. The device of claim 5, further comprising a pair of mounts, each of said mounts being coupled to said central panel, said mounts being positioned on respective lateral sides of said opening.

8. The device of claim 7, wherein each of said mounts is planar, and wherein said lower roller assembly is coupled to and extends between said mounts.

9. The device of claim 3, further comprising a pair of slots, each of said slots extending through an associated one of said mounts, said upper roller assembly having a pair of outer axles, each of said outer axles extending through an associated one of said slots.

10. The device of claim 7, further comprising: a pair of guides, each guide being coupled to an associated one of said mounts, each of said guides being positioned on an outwardly facing surface of said associated one of said mounts relative to said opening.

11. The device of claim 10, wherein said upper roller assembly has a pair of end hubs, each of said end hubs being coupled to an associated one of said guides.

12. The device of claim 11, wherein each of said end hubs comprises:
   a bearing;

a bearing plate; and a mounting plate, said bearing plate being coupled to said mounting plate, said mounting plate having opposite lateral edges positioned within opposed grooves of said associated guide wherein said mounting plate is moveable relative to said guide.

13. The device of claim 12, further comprising a pair of slots, each of said slots extending through an associated one of said mounts, said upper roller assembly having a pair of outer axles, each of said outer axles extending through an associated one of said slots, each of said outer axles extending through said mounting plate and being seated in an associated one of said bearings.

14. The device of claim 11, further comprising a pair of guide arms, each of said guide arms having a first end coupled to an associated one of said mounts, each of said guide arms having a second end coupled to an associated one of said end hubs, each of said guide arms having a first section pivotally coupled to a second section.

15. The device of claim 14, wherein said first section is straight, and wherein said second section is arcuate.

16. The device of claim 14, further comprising:

a biasing member coupled to said upper roller assembly such that said biasing member urges said upper roller towards said lower roller, wherein said biasing member has a first end coupled to one of said mounts, and wherein said biasing member has a second end coupled to one of said guide arms.

17. The device of claim 16, wherein said second end of said biasing member is coupled to said second section of said one of said guide arms.

18. A self-propelled forage harvester corn head adapter device comprising:

a frame configured for coupling to a self-propelled forage harvester;

a central panel coupled to said frame, said central panel having an opening extending through said central panel;

a lower roller assembly coupled to said central panel, said lower roller assembly having a lower roller being positioned to extend along a lower edge of said opening, said lower roller being in a fixed position relative to said opening;

an upper roller assembly coupled to said central panel, said upper roller assembly extending across said opening, said upper roller assembly having an upper roller being parallel to said lower roller assembly, said upper roller assembly being movably coupled relative to said central panel wherein spacing between said upper roller and said lower roller is adjustable, said upper roller assembly having a pair of end hubs;

a pair of mounts, each of said mounts being coupled to said central panel, said mounts being positioned on respective lateral sides of said opening, each of said mounts being planar, said lower roller assembly being coupled to and extending between said mounts;

a pair of guides, each guide being coupled to an associated one of said mounts, each of said guides being positioned on an outwardly facing surface of said associated one of said mounts relative to said opening, each of said end hubs being coupled to an associated one of said guides, each of said end hubs comprising a bearing, a bearing plate, and a mounting plate, said bearing plate being coupled to said mounting plate, said mounting plate having opposite lateral edges positioned within opposed grooves of said associated guide wherein said mounting plate is slidable relative to said guide;

a pair of slots, each of said slots extending through an associated one of said mounts, said upper roller assembly having a pair of outer axles, each of said outer axles extending through an associated one of said slots, each of said outer axles extending through said mounting plate and being seated in an associated one of said bearings;

a pair of guide arms, each of said guide arms having a first end being coupled to an associated one of said mounts, each of said guide arms having a second end coupled to an associated one of said end hubs, each of said guide arms having a first section pivotally coupled to a second section, said first section being straight, said second section being arcuate; and a biasing member coupled to said upper roller assembly such that said biasing member urges said upper roller towards said lower roller, said biasing member having a first end coupled to one of said mounts, said biasing member having a second end coupled to one of said guide arms, said second end of said biasing member being coupled to said second section of said one of said guide arms.

* * * * *